United States Patent [19]

Iwamura et al.

[11] Patent Number: 4,718,710
[45] Date of Patent: Jan. 12, 1988

[54] UNIT FOR STORING DEMOUNTABLE ROOF PANEL

[75] Inventors: Tooru Iwamura; Hirokazu Yoshikawa, both of Toyota, Japan

[73] Assignee: Toyota Jidosha Kabushiki Kaisha, Aichi, Japan

[21] Appl. No.: 883,774

[22] Filed: Jul. 9, 1986

[30] Foreign Application Priority Data

Jul. 12, 1985 [JP] Japan .............................. 60-106632

[51] Int. Cl.⁴ .............................. B60J 7/20; B60J 7/11
[52] U.S. Cl. .................................. 296/37.1; 296/218; 296/224; 224/42.42; 248/220.2
[58] Field of Search ..................... 296/218, 37.1, 37.16, 296/76, 37.8, 224; 224/42.42, 42.45 R, 311; 248/220.2, 221.3, 221.4, 222.2, 223.3, 288.5, 291, 293; 108/133; 403/328; 211/99

[56] References Cited

U.S. PATENT DOCUMENTS 3,635,518 1/1972 Eger ........................................ 296/76

FOREIGN PATENT DOCUMENTS 60-65122 5/1985 Japan .
60-65120 5/1985 Japan .

Primary Examiner—Dennis H. Pedder
Attorney, Agent, or Firm—Parkhurst & Oliff

[57] ABSTRACT

A unit for storing a demountable roof panel is disclosed, wherein movements of the demountable roof panel are controlled by a roof panel fixing device, with which one end edge of the demountable roof panel is engaged, and a roof panel holding device, with which the other end edge of the demountable roof panel is engaged, to thereby store the demountable roof panel in a storing space of a motor vehicle. The roof panel holding device includes an urging member held on an inner peripheral wall of a storing space in a manner to be movable toward the roof panel fixing device. The roof panel holding device is coupled into a mounting cutout of the demountable roof panel the edge surfaces circumscribing said cutout controlling the movement of the demountable roof panel in the vertical and lateral directions, and the urging member resiliently urges the demountable panel in the direction of the roof panel fixing device.

18 Claims, 13 Drawing Figures

UNIT FOR STORING DEMOUNTABLE ROOF PANEL

BACKGROUND OF THE INVENTION

1. Field of the Invention

This invention relates to a unit for storing a demountable roof panel, and more particularly to improvements in a unit for storing a demountable roof panel, wherein movements of the roof panel are controlled by a roof panel fixing device, with which one end edge of the demountable roof panel is engaged, and a roof panel holding device, with which the other end edge of the roof panel is engaged, to thereby store the roof panel in a storing space of a motor vehicle.

2. Description of the Prior Art

In the part, a demountable roof (sun roof) has been constructed such that the roof panel is demounted from a roof of a motor vehicle and stored in a case or the like and rested on a rear deck or a rear seat or fixed by use of a belt to the rear deck or the rear seat so as not to move during running of the vehicle. However, in either case, since the roof panel thus demounted is placed in a compartment of the vehicle, such a problem has been presented that the roof panel interferes with an occupant during his getting on or off the vehicle and luggages during loading or unloading. Furthermore, in fixing the roof panel by a belt, disadvantageously, the roof panel is not positively fixed and the reliability of fixing is low.

To obviate the above-described disadvantages, in Japanese Utility Model Laid-Open Nos. 65120/1985 and 65122/1985, as shown in FIGS. 12 and 13, the applicant proposes a roof panel storing unit including a roof panel fixing device 4 having a stay 3, into which a mounting hinge 2 or a mounting bracket is inserted and fixed, and a holding device 6 for holding and fixing a lock handle 5 of the roof panel 1, which is provided at an end edge opposite to the mounting hinge 2 of the roof panel 1, whereby the roof panel 1 is held and stored in a luggage room 7 of a motor vehicle M. Additionally, designated at 4A in the drawing is an engageable portion, with which the mounting hinge 2 of the roof panel 1 is coupled and engaged, and 4B a shock absorbing member made of rubber or synthetic resin, for preventing an inner panel of the roof panel 1 from being directly abutted against the stay 3 and damaged.

As shown in FIG. 13, the holding unit 6 includes: a base 6A fixed to the inner peripheral wall of a luggage room 7 through a bolt, not shown, so as to clamp the lock handle 5 of the roof panel; a sheet spring-shaped arm 6C opposed to the bottom of the base 6A and rotatably connected to on one end portion of the base 6A in the widthwise direction through a pin 6B, for clamping the lock handle 5 in cooperation with the base 6A; and a handle 6E rotatably connected to the other end portion of the base 6A in the widthwise direction through a pin 6B, for holding the arm 6C in the locked state. As a consequence, in order to store the roof panel 1 in the luggage room 7, it is necessary to hold the lock handle 5 of the roof panel 1 in the locked state by the handle 6E, whereby locking operation by the handle 6E is needed. Because of this, such a problem is raised that the roof panel 1 cannot be easily stored in one-touch manner.

SUMMARY OF THE INVENTION

It is the object of the present invention to provide a unit for storing a demountable roof panel, wherein storing operation to store the demountable roof panel can be easily performed in one-touch manner, and moreover, the roof panel during storing can be positively held.

To achieve the above-described object, the present invention contemplates a unit for storing a demountable roof panel, wherein movements of the demountable roof panel are controlled by a roof panel fixing device, with which one end edge of the demountable roof panel is engaged and a roof panel holding device, with which the other end edge of the demountable roof panel is engaged, to thereby store the demountable roof panel in a storing space of a motor vehicle, the roof panel holding device includes an urging member held on the inner peripheral wall of the storing space in a manner to be movable in a direction of the roof panel fixing device, coupled into a mounting cutout of the demountable roof panel to control the movement of the demountable roof panel in the vertical direction, and resiliently urging the demountable roof panel in the direction toward the roof panel fixing device.

To the above end, the present invention contemplates that said roof panel holding device includes a guide mechanism for guiding said urging member in a manner to be linearly movable toward said roof panel fixing device, and a spring for biasing said urging member in a direction of the projected forward end thereof, said urging member having a shoe coupled into the mounting cutout of said roof panel to be engaged therewith.

To the above end, the present invention contemplates that said guide mechanism has a slot elongately formed in said urging member in a direction of urging and two guide pins inserted through the slot of said urging member to slidably hold said urging member on the side of the inner peripheral wall of said storing space.

To the above end, the present invention contemplates that said slot is extended through said urging member in the widthwise direction relative to the moving direction of said urging member, and said two guide pins are provided in the widthwise direction of said urging member and an axial line passing through said two guide pins is disposed in parallel to and spaced apart from the moving direction of said urging member.

To the above end, the present invention contemplates that, out of said two guide pins, one on the side of said roof panel fixing device is shifted to a position higher than the other, whereby said urging member moves forwardly and upwardly in the direction of the roof panel fixing device.

To the above end, the present invention contemplates that said roof panel holding device is of a substantially U-shape in the vertical section, said U-shaped groove extends in the direction toward said roof panel fixing device, a case secured to the inner peripheral wall of said storing space is provided, said two guide pins cross said U-shaped groove and secured to said case, and said urging member is slidably coupled into said U-shaped groove.

To the above end, the present invention contemplates that said urging member has a spring engageable stepped portion projected downwardly of said slot into said U-shaped groove, and said spring is provided between said engageable stepped portion and said inner peripheral wall portion in the bottom of said U-shaped groove.

To the above end, the present invention contemplates that said spring is a coil spring provided in the bottom of said U-shaped groove.

According to the invention, the roof panel holding device includes the urging member for resiliently urging the demountable roof panel in the direction of the roof panel fixing device, so that the demountable roof panel can be resiliently clamped by the fixing device and the holding device, thus holding and fixing the roof panel positively. Moreover, the demountable roof panel is resiliently urged so as to be clamped by the fixing device and the holding device, whereby no locking device, for example, the handle and the like is needed, so as to fix the roof panel as in the conventional case, so that it suffices to merely interpose the demountable roof panel between the holding device and the fixing device with no need of locking operation and the operation of storing the demountable roof panel can be easily carried out.

DETAILED DESCRIPTION OF THE PREFERRED EMBODIMENTS

Figure 1:
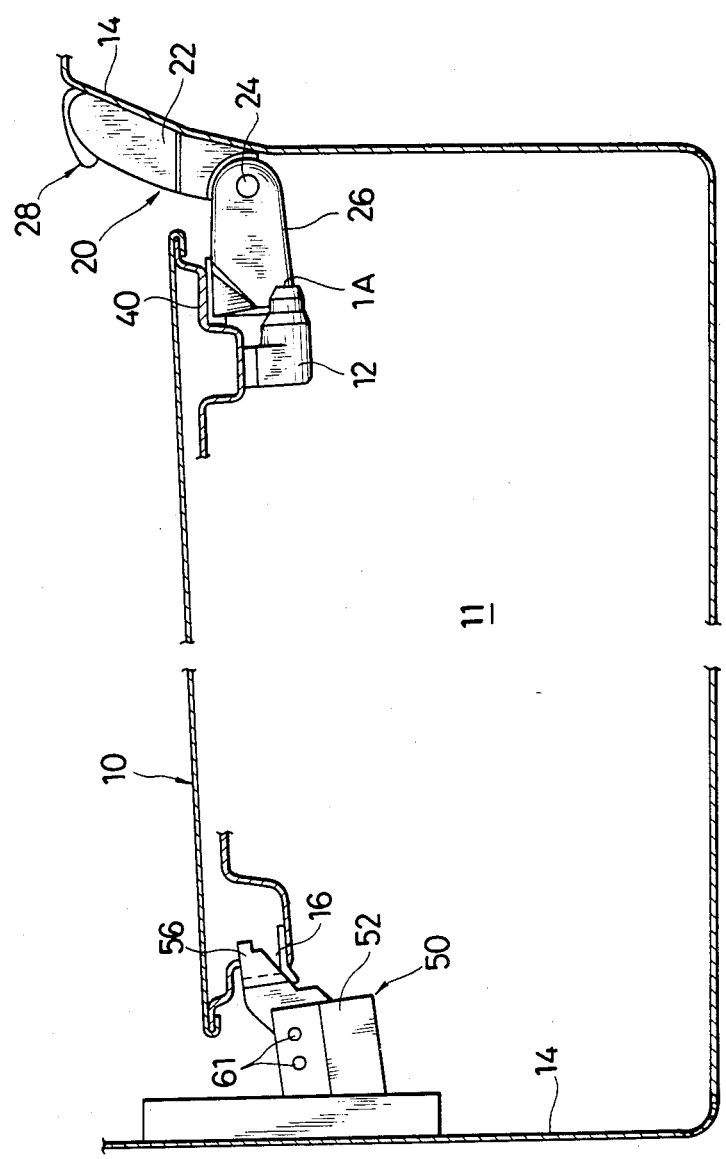
FIG. 1 is a side view showing one embodiment of the unit for storing the demountable roof panel according to this invention.

The embodiments of the present invention will hereunder be described with reference to the accompanying drawings.

As shown in FIGS. 1 to 10, according to this embodiment, in a unit for storing a demountable roof panel 10, wherein movements of the demountable roof panel 10 are controlled by a roof panel fixing device 20, with which a mounting bracket 12 at one end edge of the demountable roof panel 10 is engaged, and a roof panel holding device 50, with which the other end edge of the demountable roof panel 10 is engaged, to thereby store the demountable roof panel 10 in a storing space 11 of a motor vehicle, said roof panel fixing device 20 includes:

a support 22 mounted to an inner peripheral wall 14 of the storing space 11;

a stay 26 pivoted on a rotary shaft 24 to be rotatable about the rotary shaft 24 horizontally provided on the support 22 within a scope from a retracted position substantially closely attached to the inner peripheral wall 14 of the storing space 11 to a position projected into the storing space 11, and engaged with the mounting bracket 12 provided at one end edge of the demountable roof panel 10; and stay fixing means 28 for fixing the stay 26 to the projected position so that the mounting bracket 12 is engaged with the stay 26.

Figure 3:
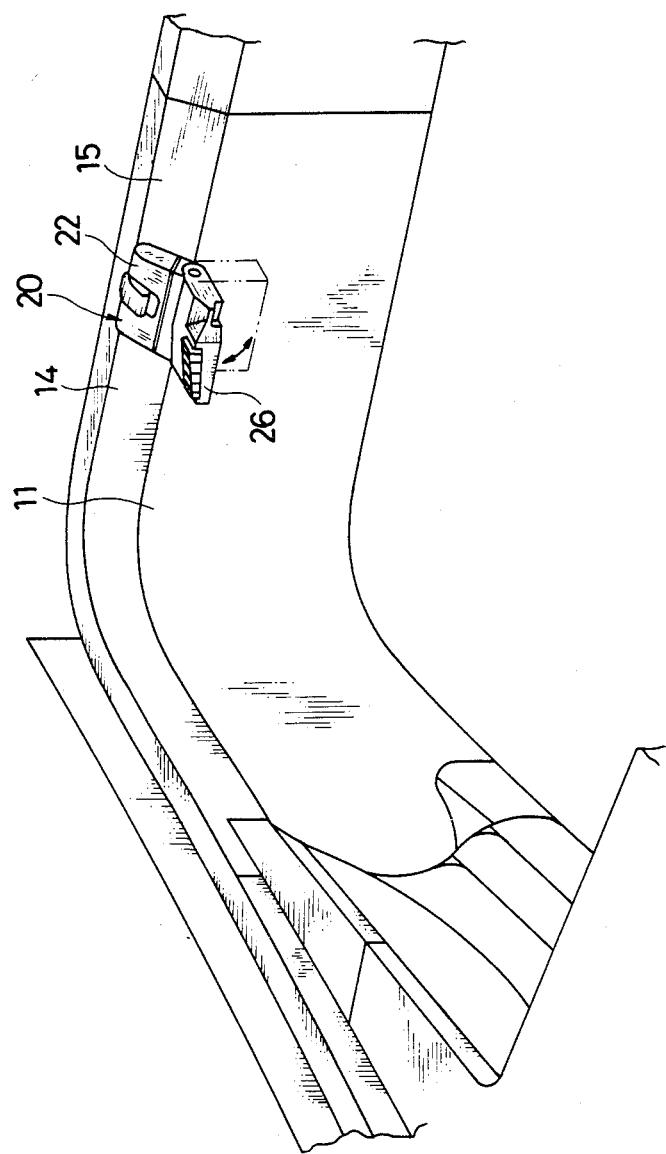
FIG. 3 is a perspective view showing the position where the roof panel fixing device is mounted.
Figure 4:
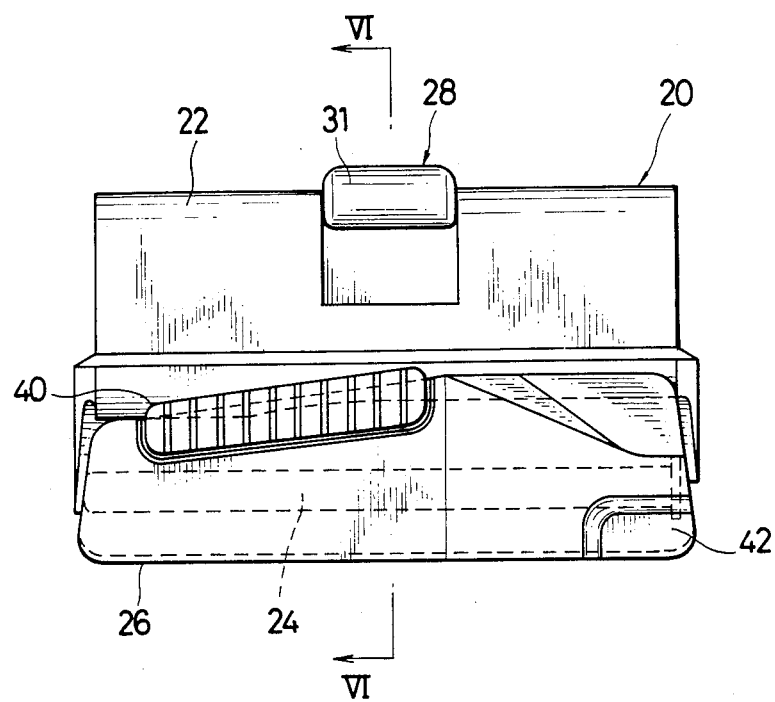
FIG. 4 is a front view showing the roof panel fixing device.

As shown in FIG. 3, a pair of the roof panel fixing devices 20 are provided on a lower back reinforcement 15 in the rear portion of a rear deck of a vehicle body bisymmetrically with respect to a center line in the widthwise direction of the vehicle body.

Figure 2:
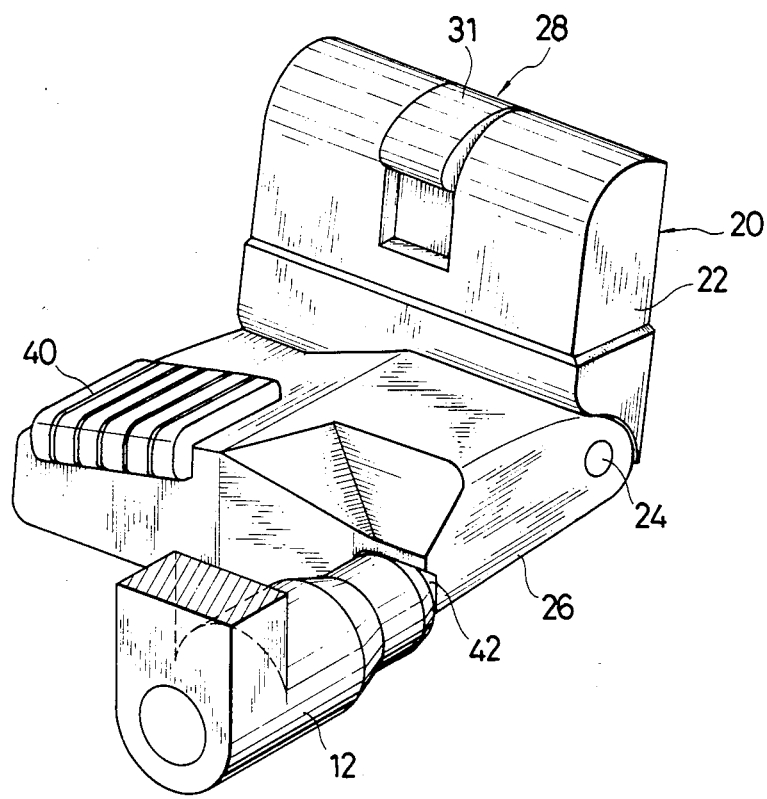
FIG. 2 is a perspective view showing the roof panel fixing device in the above embodiment.
Figure 5:
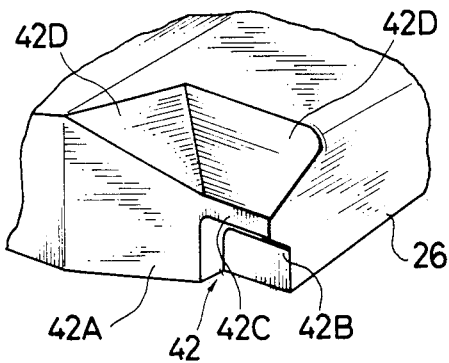
FIG. 5 is a perspective view showing the mounting bracket engaged portion on the stay.

As shown in FIGS. 2 and 5, the stay 26 is formed thereon with: a roof panel contact portion 40, against which the undersurface of the demountable roof panel 10 is abutted; and a mounting bracket engageable portion 42 for controlling movements of the mounting bracket 12 in the upward, rearward and lateral directions thereof.

The roof panel contact portion 40 is provided at the upper portion of the stay 26 and formed of a shock absorbing member made of rubber or synthetic resin so as not to damage the undersurface of the demountable roof panel 10.

Furthermore, the mounting bracket engageable portion 42 is formed on the inner end of the stay 26 in the widthwise direction of the vehicle body as shown in FIG. 5, and includes: a lateral movement control wall 42A for controlling the movement of the mounting bracket 12 of the demountable roof panel 10 in the widthwise direction of the vehicle body; a rearward movement control wall 42B for controlling the movement of the mounting bracket 12 in the rearward direction of the vehicle body; an upward movement control convex wall 42C extended from the top portion of the rearward movement control wall 42B, for controlling the upward movement of the mounting bracket 12; and a mounting bracket guide wall 42D extended from the top portions of the lateral movement control wall 42A and the upward movement control convex wall 42C and progressively flared upwardly.

Figure 6:
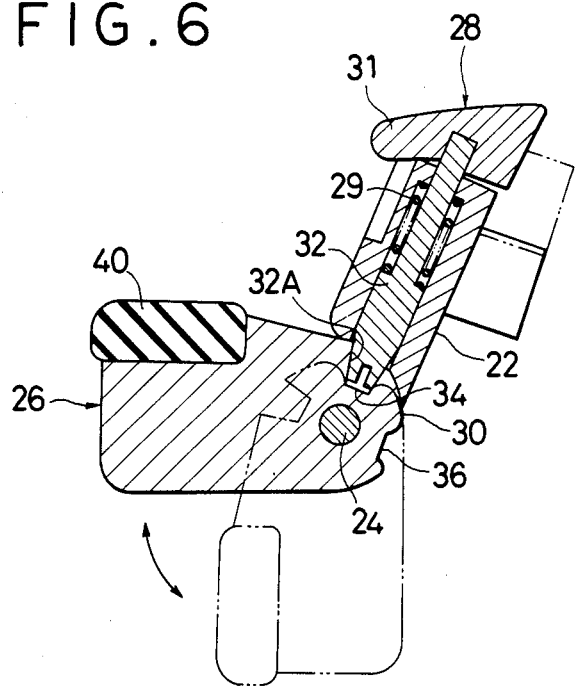
FIG. 6 is a sectional view taken along the line VI—VI in FIG. 4, showing the means for fixing the stay.

As shown in FIG. 6, the stay fixing means 28 includes: a tapered engaging rod 32 provided on the support 22 in a manner to be movable toward the rotary shaft 24 of the stay 26 and to be resiliently urged by a coil spring 29; a control knob 31 secured to the top end of the engaging rod 32; a first engageable hole 34 formed on the outer periphery of an insertion portion 30, through wihch the rotary shaft of the stay 26 is inserted, for being engaged with a forward end portion 32A of the engaging rod 32 when the stay 26 reaches a position where the stay 26 is engaged with the mounting bracket 12 of the demountable roof panel 10; and a second engageable hole 36 formed on the outer periphery of the insertion portion 30 for receiving the rotary shaft 24 of the stay 26, with which the forward end portion 32A of the engaging rod 32 is engaged when the stay 26 reaches a position where the stay 26 comes to be along the inner peripheral wall 14 of the storing space 11 (Refer to two-dot chain lines in FIG. 6). The first and second engageable holes 34 and 36 each have a shape complementary to the shape of the forward end portion 32A of the engaging rod 32. In other words, the first and second engageable holes 34 and 36 are each formed to provide a conical or pyramidal hole progressively decreased in opening area toward the bottom thereof. The second engageable hole 36 is shallower than the first engageable hole 34.

Figure 7:
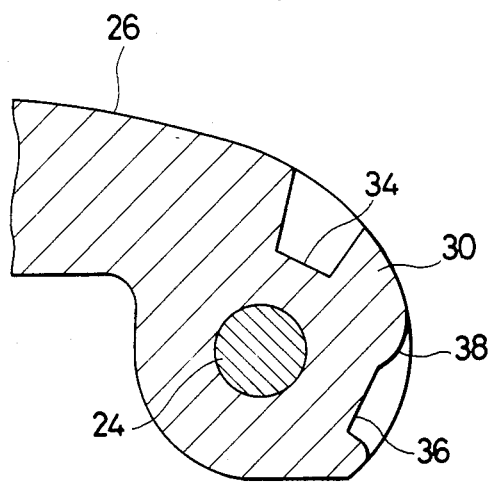
FIG. 7 is a sectional view showing the portion, through which the rotary shaft of the stay is inserted.

As shown in FIG. 7, the outer peripheral surface of the rotary shaft insertion portion 30 of the stay 26, extending from the second engageable hole 36 to the first engageable hole 34 is formed to provide a moderately inclined surface 38 so that the forward end portion 32A of the engaging rod 32 can run thereon when the stay 26 rotates in the clockwise direction in the drawing.

Figure 8:
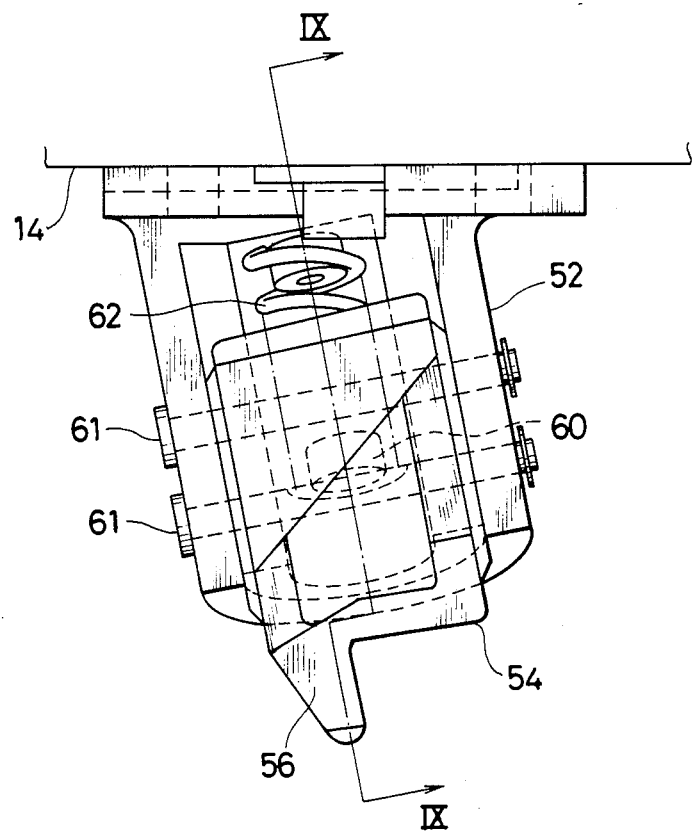
FIG. 8 is a plan view showing the roof panel holding device.
Figure 9:
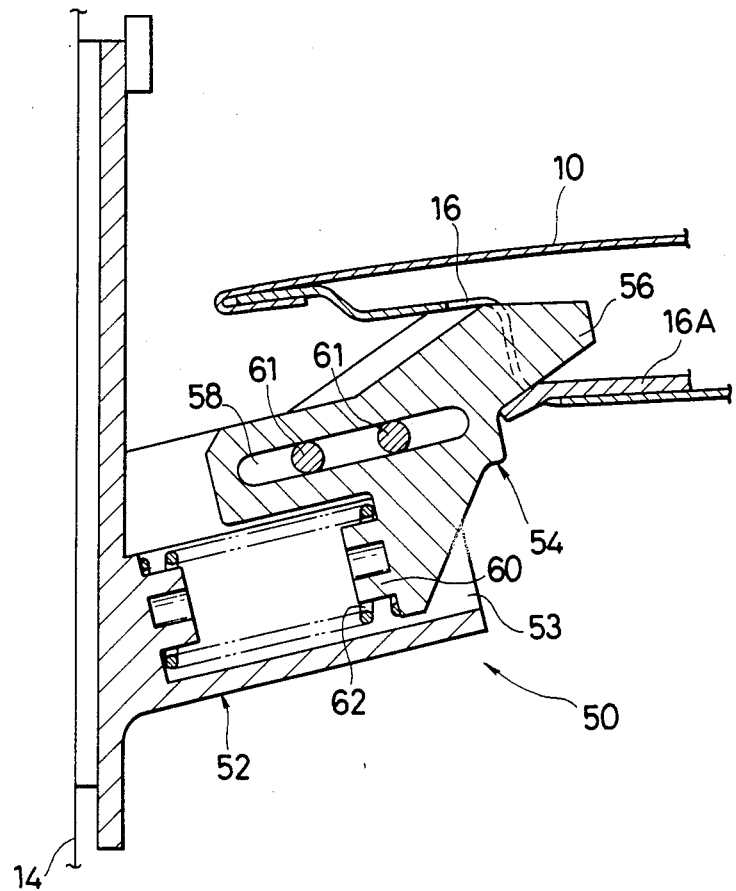
FIG. 9 is a sectional view taken along the line IX—IX in FIG. 8.

As shown in FIGS. 8 and 9, the roof panel holding device 50 includes: a case 52 secured to the inner peripheral surface 14 of the storing space 11, opposed to the roof panel fixing device 20; and an urging member 54 movably held by the case 52 in a first moving direction toward the roof panel fixing device 20, coupled at one end thereof into a mounting cutout 16 of the demountable roof panel 10 to control the movement of the demountable roof panel 10 in the vertical direction and resiliently urging the demountable roof panel 10 in the direction of the roof panel fixing device 20 to control the roof panel in the lateral direction. In FIG. 9, designated at 16A is a guide being in abutting contact with the undersurface of a shoe 56.

The urging member 54 is provided at the forward end thereof with the shoe 56 coupled into the mounting cutout 16 of the demountable roof panel 10 and engaged therewith, and further, includes a slot 58 elongately formed in a direction of urging and a coil spring engageable stepped portion 60 projected downwardly from the slot 58. Furthermore, the case 52 includes: a groove 53 being of a U-shape in section; two guide pins 61 secured, crossing the U-shaped groove 53, and extending through the slot 58 of the urging member 54 to thereby slidably mount the urging member 54 to the case 52; and a coil spring 62 engaged at one end thereof with the case 52 and at the other end with the coil spring engageable stepped portion 60 of the urging member 54 to thereby urge the coil spring engageable stepped portion 60 outwardly.

Action of this embodiment will hereunder be described.

As shown in FIG. 6, to store the demountable roof panel 10, the stay 26 of the roof panel fixing device 20 is rocked about the rotary shaft 24 upwardly to the extent where the stay 26 is held generally horizontally. Due to this upward rocking of the stay 26, the forward end portion 32A of the engaging rod 32 of the stay fixing means 28 is inserted and coupled into the first engageable hole 34 by the resilient force of the coil spring 29, whereby the stay 26 is held horizontally to be generally perpendicular to the support 22, so that the demountable roof panel 10 is brought into a state of being storable.

Figure 10:
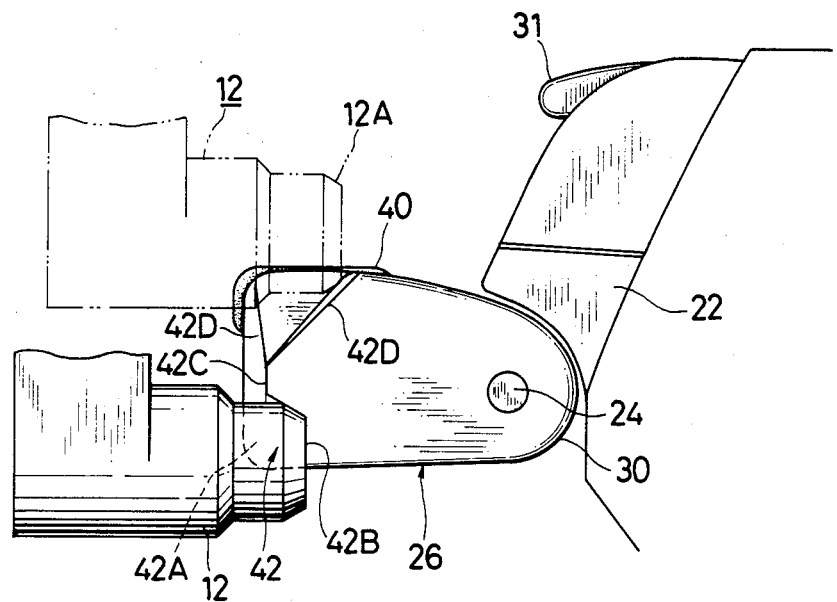
FIG. 10 is a side view showing the engagement between the mounting bracket of the demountable roof panels and the stay.

Subsequently, as shown in FIG. 1, the shoe 56 of the roof panel holding device 50 is positioned with the mounting cutout 16 of the demountable roof panel 10 and the shoe 56 is coupled into the mounting cutout 16. Thereafter, the demountable roof panel 10 is driven forwardly against the resilient force of the coil spring 62 in the case 52 to urge the urging member 54. In this case, the end edge of the demountable roof panel 10 on the side of the roof panel fixing device 20 is pushed downwardly, whereby the mounting bracket 12 of the demountable roof panel 10 is engaged with the mounting bracket engageable portion 42 of the stay 26. As shown in FIG. 10, at this time, when the end edge of the demountable roof panel 10 on the side of the fixing device 20 is urged downwardly, first, a forward end 12A of the mounting bracket 12 is guided by the mounting bracket guide wall 42D of the mounting bracket engageable portion 42 to move downwardly, further, runs on the upward movement control convex wall 42C and positioned and fixed into the mounting bracket engageable portion 42, in which the forward end 12A of the mounting bracket 12 is surrounded by the vertical movement control convex wall 42C, the lateral movement control wall 42A and the rearward movement control wall 42B so as to be controlled in its movement in the three directions.

As a consequence, in this embodiment, the demountable roof panel 10 can be easily stored in the storing space 11 by such an operation that the shoe 56 is coupled into the mounting cutout 16, and thereafter, the rear end edge of the demountable roof panel 10 is merely pushed downwardly. To remove the demountable roof panel 10 from the storing space 11, the preceding steps are reversed.

When the demountable roof panel 10 is not to be stored, the control knob 31 of the roof fixing device 20 is pulled up. With this operation, the forward end portion 32A of the engaging rod 32 is removed from the first engageable hole 34 of the stay 26, so that the stay 26 can rock about the rotary shaft 24 by gravity. With this operation, the roof panel fixing device 20 can be folded in one-touch manner at the position where the stay 26 is substantially closely attached to the inner peripheral wall 14 of the storing space 11. As a consequence, when the demountable roof panel 10 is not stored, the stay 26 does not project into the luggage space, whereby no interference with the loading or unloading occurs, and the stay 26 does not remain projected into the luggage space, thus preventing the luggage space from being decreased.

Moreover, the forward end portion 32A of the engaging rod 32 is engaged with the second engageable hole 36 when the stay 26 reaches the position where the stay 26 comes to be along the inner peripheral wall 14 of the storing space 11, so that the stay 26 can be fixed when the stay 26 is folded.

Further, the second engageable hole 36 is shallower than the first engageable hole 34, so that the resilient force of the coil spring 29 when the engaging rod 32 is engaged with the second engageable hole 36 can be made larger than the resilient force when the engaging rod 32 is engaged with the first engageable hole 34. As a consequence, the stay 26 can be stably fixed to the support 22 in the folded state by the resilient force of the coil spring 20 when the engaging rod 32 is engaged with the first engageable hole 34. Because of this the stay 26 has no looseness on the rotary shaft 24, thereby eliminating noises.

The outer peripheral surface of the rotary shaft insertion portion 30 of the stay 26, extending from the second engagement hole 36 to the first engageable hole 34, is formed to provide a moderately inclined surface 38, whereby the forward end portion 32A of the engaging rod 32 runs thereon when the stay 26 rotates from the state, where the engaging rod 32 is engaged with the stay second engageable hole 36, to the clockwise direction in FIGS. 6 and 7. As a consequence, when the stay 26 is lifted upwardly to be held substantially horizontally in order to store the demountable roof panel 10, the control knob 31 need not be urged upwardly to remove the forward end portion 32A of the engaging rod 32 from the second engageable hole 36. The forward end portion 32A is removed from the second engageable hole 36 due to the function of the moderately inclined surface 38, so that the stay 26 can be easily brought into the state where the demountable roof panel 10 is stored.

In the above embodiment, the first engageable hole 34 is formed to provide a conical or pyramidal hole progressively decreased in opening area toward the bottom thereof, and the forward end portion 32A of the engaging rod 32 has the shape complementary to the shape of the engageable hole 34, so that the stay 26 can be positively fixed to the support 22 without causing coupling looseness between the engaging rod 32 and the first engageable hole 34.

The roof panel holding device 50 is provided with the urging member 54 for resiliently urging the demountable roof panel 10 in the direction of the roof panel fixing device 20, so that the holding device 50 can cooperate with the roof panel fixing device 20 in fixedly holding the demountable roof panel 10 in the storing unit not to move in the longitudinal, vertical and lateral directions.

Figure 11:
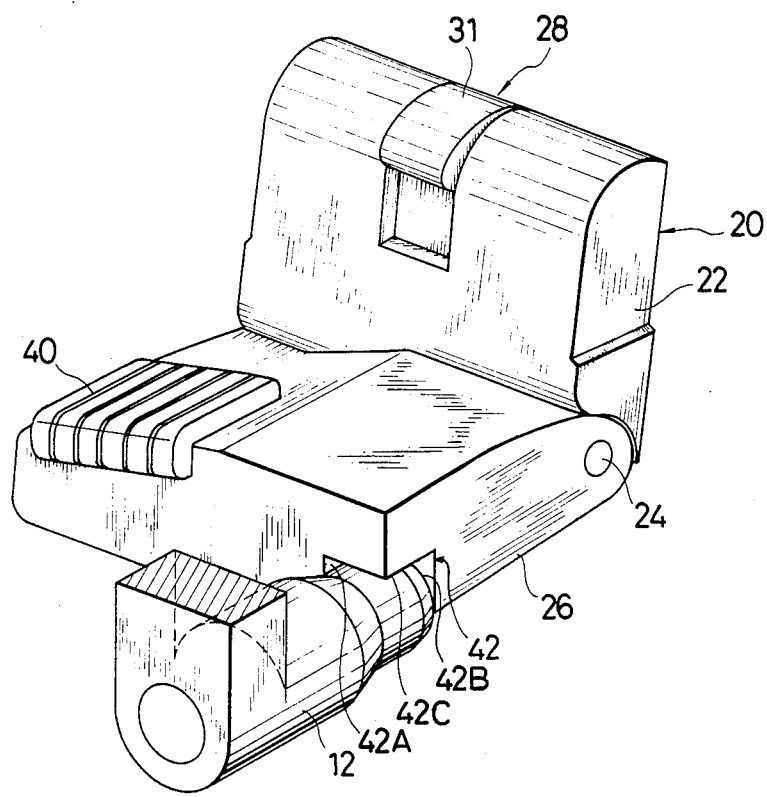
FIG. 11 is a perspective view showing the roof panel fixing device in a second embodiment.
Figure 12:
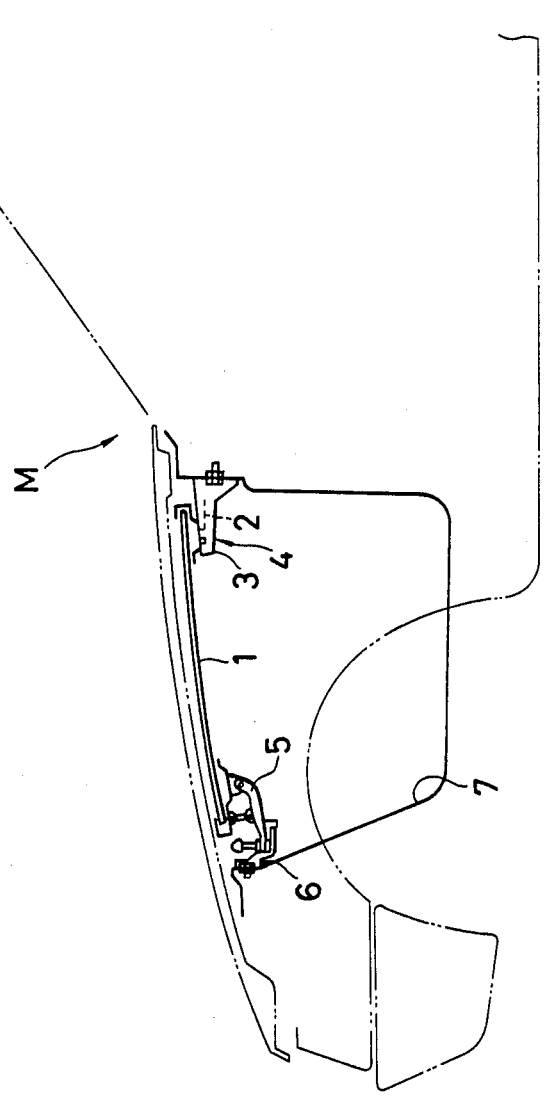
FIG. 12 is a side view showing the conventional unit for storing the demountable roof panel.
Figure 13:
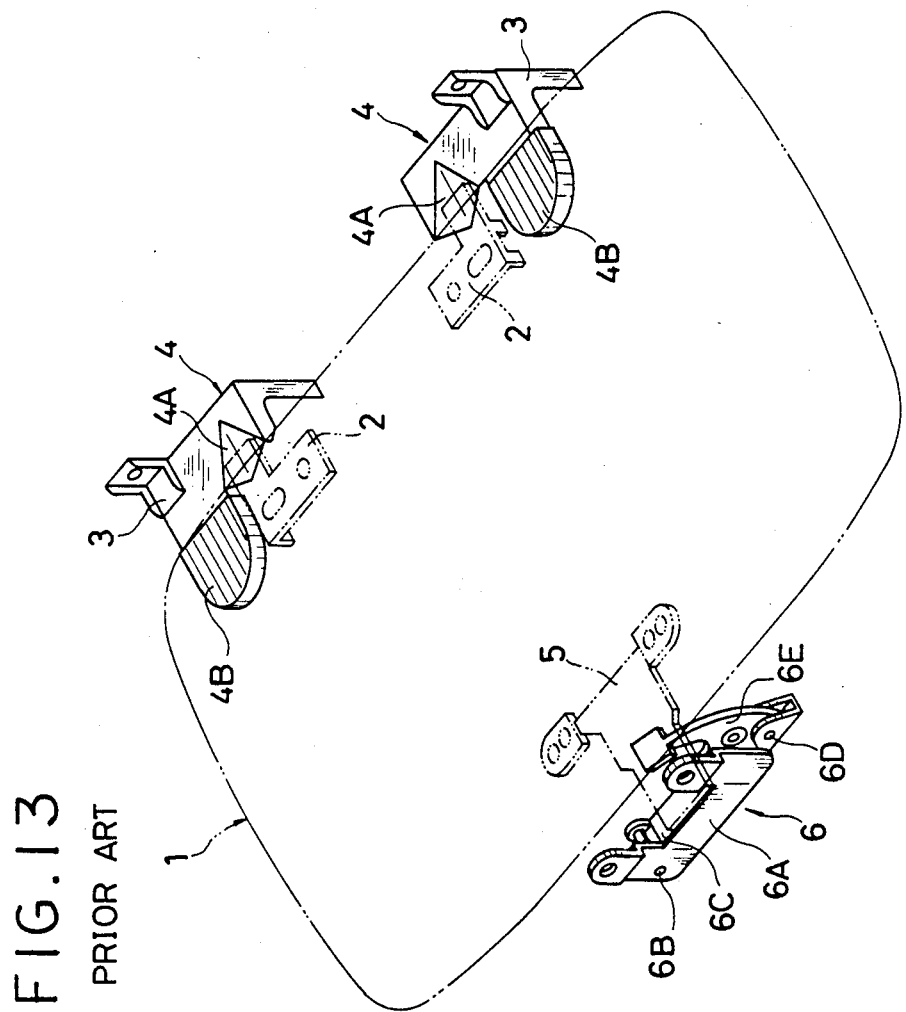
FIG. 13 is a perspective view thereof.

In the above embodiment, the mounting bracket engageable portion 42 of the stay 26 is formed such that the mounting bracket guide wall 42D is extended from the top portions of the lateral movement control wall 42A and the upward movement control convex wall 42C, however, the present invention need not necessarily be limited to this, and, for example, as shown in FIG. 11, such a simplified arrangement may be adopted that the mounting bracket engageable portion 42 is formed merely by the lateral movement control wall 42A, the rearward movement control wall 42B and the upward movement control convex wall 42C. Further, the mounting bracket engageable portion 42 may be formed to provide a coupling hole, into which the mounting hinge of the roof panel 10 is coupled.

What is claimed is:

1. A unit for storing a demountable roof panel, wherein movements of said demountable roof panel are controlled by a roof panel fixing device, with which one end edge of said demountable roof panel is engaged, and a roof panel holding device, with which an opposite end edge of said demountable roof panel is engaged, to thereby store said demountable roof panel in a storing space of a motor vehicle, said roof panel holding device including an urging member held on an inner peripheral wall of a storing space in a manner to be movable in a direction of said roof panel fixing device for coupling into a mounting cutout of said demountable roof panel, wherein edge surfaces circumscribing said cutout control the movement of said demountable roof panel in vertical and lateral directions, said urging member resiliently urging said demountable roof panel toward the direction of said roof panel fixing device.

2. The unit for storing a demountable roof panel as set forth in claim 1, wherein said roof panel holding device includes a guide means for guiding said urging member in a first moving direction to be linearly movable toward said roof panel fixing device, and a spring for biasing said urging member in the first direction toward said roof panel fixing device, said urging member having a shoe coupled into the mounting cutout of said roof panel to be engaged therewith.

3. The unit for storing a demountable roof panel as set forth in claim 2, wherein said guide means has a slot elongately formed in said urging member in the first direction and two guide pins inserted through the slot of said urging member to slidably hold said urging member on a side of the inner peripheral wall of said storing space.

4. The unit for storing a demountable roof panel as set forth in claim 3, wherein said slot is extended through said urging member in the widthwise direction relative to the first moving direction of said urging member, and said two guide pins are provided in the widthwise direction of said urging member, an axial line passing through said two guide pins being disposed parallel to the first moving direction of said urging member.

5. The unit for storing a demountable roof panel as set forth in claim 3, wherein one of said two guide pins, toward said roof panel fixing device, is shifted to a position higher than the other, whereby said urging member moves forwardly and upwardly in the direction of the roof panel fixing device.

6. The unit for storing a demountable roof panel as set forth in claim 4, wherein one of said two guide pins, toward said roof panel fixing device, is shifted to a position higher than the other, whereby said urging member moves forwardly and upwardly in the direction of the roof panel fixing device.

7. The unit for storing a demountable roof panel as set forth in claim 3, wherein said roof panel holding device includes a case secured to the inner peripheral wall of said storing space and a substantially U-shaped groove in a vertical cross-section formed by said case, said U-shaped groove extends in the first direction toward said roof panel fixing device, said two guide pins cross said U-shaped groove and are secured to said case, and said urging member is slidably coupled into said U-shaped groove.

8. The unit for storing a demountable roof panel as set forth in claim 4, wherein said roof panel holding device includes a case secured to the inner peripheral wall of said storing space and a substantially U-shaped groove in a vertical cross-section formed by said case, said U-shaped groove extends in the first direction toward said roof panel fixing device, said two guide pins cross said U-shaped groove and are secured to said case, and said urging member is slidably coupled into said U-shaped groove.

9. The unit for storing a demountable roof panel as set forth in claim 5, wherein said roof panel holding device includes a case secured to the inner peripheral wall of said storing space and a substantially U-shaped groove in a vertical cross-section formed by said case, said U-shaped groove extends in the first direction toward said roof panel fixing device, said two guide pins cross said U-shaped groove and are secured to said case, and said urging member is slidably coupled into said U-shaped groove.

10. The unit for storing a demountable roof panel as set forth in claim 6, wherein said roof panel holding device includes a case secured to the inner peripheral wall of said storing space and a substantially U-shaped groove in a vertical cross-section formed by said case, said U-shaped groove extends in the first direction toward said roof panel fixing device, said two guide pins cross said U-shaped groove and are secured to said case, and said urging member is slidably coupled into said U-shaped groove.

11. The unit for storing a demountable roof panel as set forth in claim 7, wherein said urging member has a spring engageable stepped portion projected downwardly from said slot into said U-shaped groove, and said spring is provided between said engageable stepped portion and said inner peripheral wall portion in the bottom of said U-shaped groove.

12. The unit for storing a demountable roof panel as set forth in claim 8, wherein said urging member has a spring engageable stepped portion projected downwardly from said slot into said U-shaped groove, and said spring is provided between said engageable stepped portion and said inner peripheral wall portion in the bottom of said U-shaped groove.

13. The unit for storing a demountable roof panel as set forth in claim 9, wherein said urging member has a spring engageable stepped portion projected downwardly from said slot into said U-shaped groove, and said spring is provided between said engageable stepped portion and said inner peripheral wall portion in the bottom of said U-shaped groove.

14. The unit for storing a demountable roof panel as set forth in claim 10, wherein said urging member has a spring engageable stepped portion projected downwardly from said slot into said U-shaped groove, and said spring is provided between said engageable stepped portion and said inner peripheral wall portion in the bottom of said U-shaped groove.

15. The unit for storing a demountable roof panel as set forth in claim 11, wherein said spring is a coil spring provided in the bottom of said U-shaped groove.

16. The unit for storing a demountable roof panel as set forth in claim 12, wherein said spring is a coil spring provided in the bottom of said U-shaped groove.

17. The unit for storing a demountable roof panel as set forth in claim 13, wherein said spring is a coil spring provided in the bottom of said U-shaped groove.

18. The unit for storing a demountable roof panel as set forth in claim 14, wherein said spring is a coil spring provided in the bottom of said U-shaped groove.

* * * * *